250-201 AU 252 EX CROSS REFERENCE EXAMINER
8212 XR 2,716,717

Aug. 30, 1955 W. R. DRESSER 2,716,717

CONTROL OF COLOR FOR PROJECTOR ARC LIGHTS

Filed July 21, 1954 2 Sheets-Sheet 1

INVENTOR.
W. Robert Dresser.
BY Emery, Varney, Whittemore & Dix
ATTORNEYS

Aug. 30, 1955 W R. DRESSER 2,716,717

CONTROL OF COLOR FOR PROJECTOR ARC LIGHTS

Filed July 21, 1954 2 Sheets-Sheet 2

INVENTOR.
W. Robert Dresser by Emery, Varney, Whittemore & Dix

ATTORNEYS

United States Patent Office 2,716,717
Patented Aug. 30, 1955

2,716,717

CONTROL OF COLOR FOR PROJECTOR ARC LIGHTS

W. Robert Dresser, Long Hill, Conn., assignor to The Vitarama Corporation, Huntington, N. Y., a corporation of New York Application July 21, 1954, Serial No. 444,814
9 Claims. (Cl. 314—21)

This invention relates to the controlling of the color of an arc light which is used for a projector, and particularly a motion picture projector.

The color of the light from a carbon arc varies considerably from one time to another during its operation. Ordinarily this is not objectionable in motion picture projectors because the change in color is not noticeable to the audience when there is no reference of comparison. With the advent of mosaic pictures for theater projection, a different situation is presented because the different images that make up the mosaic picture are projected from different projectors having different arc lights. If the light from one projector varies so that its color is different from that of the light of the projector of an immediately adjacent image on the screen, then the change in color is noticeable to the audience because there are adjacent areas of different color for comparison. When the variation in color is substantial, or where the variation in two adjacent images is in opposite directions in the spectrum, then the continuity of the picture area is impaired to an objectionable degree.

It is an object of this invention to provide automatic apparatus for maintaining the color of an arc light within narrow limits of variations so that when a plurality of such lights are used in different projectors for making a mosaic picture on a screen, no variations in the color of the adjacent images will be apparent to the audience.

The invention operates on a principle of compensation. If the color of the light varies so that it has insufficient red, then the invention compensates for this by supplying to the arc a color producing material which will add more light of the red wave length to the total illumination produced by the arc. Similarly, the invention supplies material for increasing the yellow and blue components of the light as needed; and by adding controlled amounts of the different materials for producing different colors, the arc light can be maintained substantially constant in color.

One feature of the invention relates to the automatic control of the color compensation. It will be evident that compensation by manually operated means will not be effective to maintain as critical a control of the color as when the compensation is effected by automatic operation. In the preferred construction of the invention there are monitoring cells which are sensitive to different colors and which detect a change in the color components of the light. These monitoring cells control the supply of material for adding color in a narrow band of wave lengths as necessary to restore the color balance.

In describing the invention, reference will be made to the supplying of material to the arc. It will be understood that the term "arc," as used herein, refers not only to the space in which the actual electrical discharge takes place, but also refers to the ionized envelope of the arc.

Other objects, features and advantages of the invention will appear or be pointed out as the description proceeds.

In the drawing, forming a part hereof, in which like reference characters indicate corresponding parts in all the views.

Figures 1, 2:
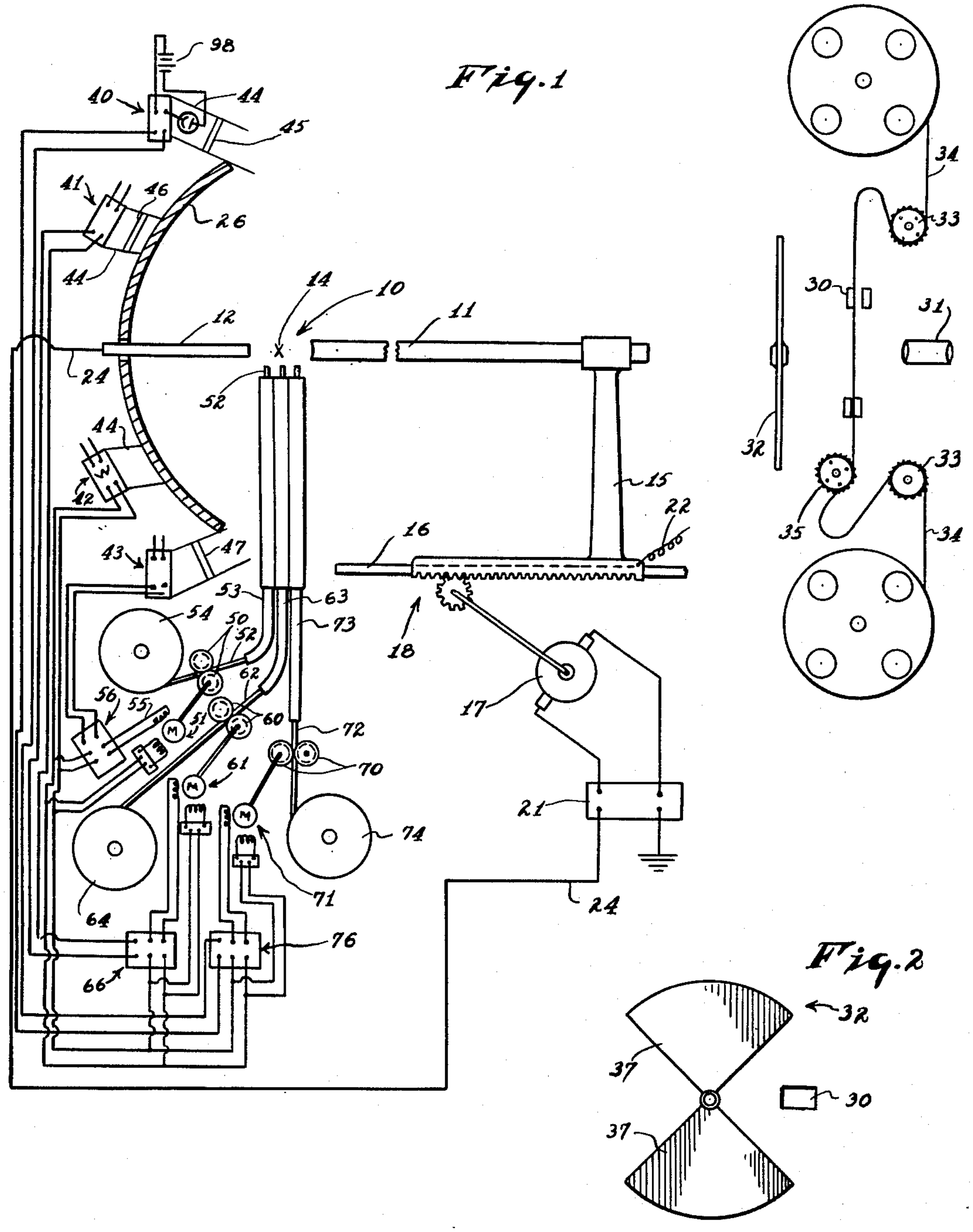
Figure 1 is a diagrammatic view showing a projector with means for automatically controlling the color of the arc light.
Figure 2 is a rear view of the projector shutter shown in Figure 1.

Figure 1 shows an arc light 10, preferably a carbon arc light, having electrodes 11 and 12. The "arc" is designated by the reference character 14. The electrode 11 is a consuming electrode and it is carried by a holder 15 which slides along a guideway 16 to advance the electrode 11 toward the electrode 12 as the electrode 11 burns away.

The feeding of the electrode 11 is done mechanically by an electric motor 17 connected with the holder 15 through rack and pinion mechanism 18. The operation of the motor 17 is under the influence of control means 21. Power for operating the motor 17 is supplied from these control means and the supply of power is responsive to the current flowing in the circuit of the arc 10. Current is supplied to the arc from a power line 22, and the control means 21 are connected in the circuit with the arc through a conductor 24. This illustration is merely diagrammatic and representative of automatic mechanism for regulating the gap between the electrodes of an arc light. Such automatic mechanism is well known to those skilled in the art.

The arc light 10 is in a motion picture projector illustrated diagrammatically by a reflector 26, a film gate 30, lens 31, shutter 32, sprockets 33 on which the film 34 runs continuously, and a pull down comprising an intermittently operated sprocket 35 for advancing the film 34, one frame at a time, in the usual manner.

The shutter 32 is best shown in Figure 2, and it has two blades 37 which pass across the film gate 30 each time that the shutter rotates. In the operation of the projector, the shutter 32 rotates continuously in the usual manner. The rearward surfaces of the shutter blades 37 are preferably colored white so as to reflect light rearwardly when they pass behind the film gate 30.

Referring again to Figure 1, there are monitoring cell assemblies 40, 41, 42 and 43. These monitoring cell assemblies are located at angularly spaced regions around the periphery of the reflector 26. Each of the monitoring cell assemblies has a hood 44 for shutting off light to the cell, except the light reflected from the portion of the shutter blade which is located behind the film gate. Thus a pulse of light is reflected to the cell in each of the monitoring cell assemblies 40, 41, 42 and 43 each time one of the shutter blades 37 passes behind the film gate 30. Since there are two shutter blades 37, each monitoring cell receives two separate pulses of light for every revolution of the shutter.

The cells in the assemblies 40, 41 and 43 are color sensitive, and they are sensitive to different colors. Different kinds of monitoring cells can be used which are more sensitive to some wave lengths than to others; but in the preferred embodiment of the invention, the cells in the assemblies 40, 41, 42 and 43 are the same, and the cells in the assemblies 40, 41 and 43 are made color sensitive by having color filters 45, 46 and 47 located in front of them.

For example, by having the filter 45 red, the monitoring cell in the assembly 40 is made most responsive to red components of the light because the filter 45 absorbs most of the other color components of the light. The filter 46 is yellow and the filter 47 is blue. It will be understood that other combinations of color filters can be used.

A pair of feed rolls 50 are driven by a servo motor 51 to advance a strip 52 through a guide 53 terminating at a region adjacent to the arc 14. If the strip 52 is a rigid stick, then the guide 53 must be straight; but the strip 52 is preferably a wire wound on a spool 54 from which it unwraps as the feed rolls 50 advance the end of the strip into the arc as needed. The motor 51 has a control winding 55, and the supply of power to the control winding 55 comes from a motor controller 56, which operates in response to the relative variations in the current in the circuits of the monitoring cells of the assemblies 42 and 43, as will be explained more fully in connection with Figure 6.

For the present it is sufficient to understand that the monitoring cell in assembly 42 responds to white light and that the monitoring cell in assembly 43 responds to blue light. These cells are adjusted so that as long as the white light contains its normal component of blue light, the output from the cell assemblies 42 and 43 will balance one another. If the normal component of blue light decreases, then the controller 56 energizes the control winding 55 with current flowing in a phase relationship such as to rotate the motor 51 and feed rolls 50 in a direction to feed the strip 52 into the arc.

The strip 52 is made of material which adds a blue component to the light of the arc. As soon as sufficient strip material has been fed into the arc to bring the blue component up to normal, the output from the monitoring cell assemblies 42 and 43 will again balance and the motor 51 will stop the feeding of any further blue modifying material to the arc.

If desired, the controller 56 can be constructed so as to operate the motor 51 in a reverse direction if the blue component of the light exceeds the normal component at which the output from the monitoring cell assemblies 42 and 43 balance. This is usually unnecessary if the strip 52 is consumed by the arc as is usually the case, because when the strip is not being advanced progressively into the arc, the consuming of the strip has the same effect as if the feed rolls were reversed. When the end of the strip 52 is no longer close enough to the arc to effect the color of the light, then there is no purpose in reversing the motor 51 to retract the strip 52 any further.

Other feed rolls 60 are driven by a motor 61 to advance a strip 62 through a guide 63 which terminates at a location just below the arc 14. This strip 62 is taken from a spool 64. The operation of the motor 61 is under the influence of a motor controller 66 which responds to the relative strength of the signals from the monitoring cell assemblies 41 and 42.

There are feed rolls 70 driven by a motor 71 for advancing a strip 72 through a guide way 73 which corresponds to the guides 53 and 63. The strip 72 is carried on a spool 74 and the operation of the motor 71 is responsive to a controller 76 which is operated by the relative strength of the signals from the monitoring cell assemblies 40 and 42.

Figure 3:
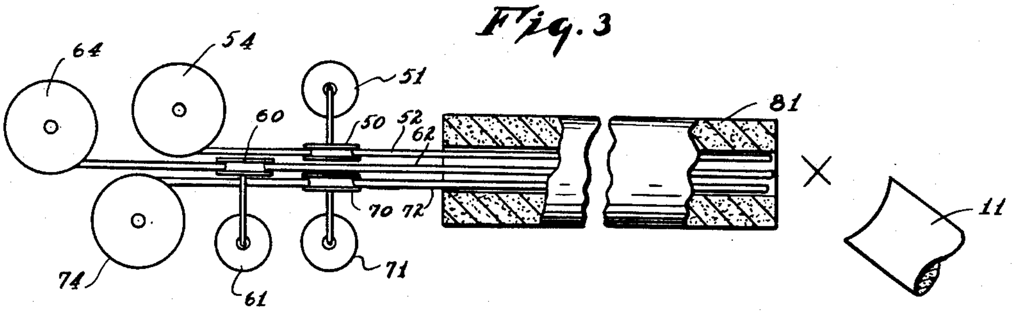
Figure 3 is a fragmentary, diagrammatic view showing a modified form of the invention.

Figure 3 shows a modified form of the invention in which the arc light has electrodes 11 and 81. There is an axially extending passage through the electrode 81, and the color modifying strips 52, 62 and 72 are fed through this axial passage in the electrode 81. The feed rolls, spools and motors for advancing the strips 52, 62 and 72 in the modified construction shown in Figure 3 are differently oriented from the corresponding parts in Figure 1, but they are indicated by the same reference characters, and the motors are operated in response to signals from monitoring cell assemblies in the same way as in the combination shown in Figure 1.

Figures 4, 5, 6:
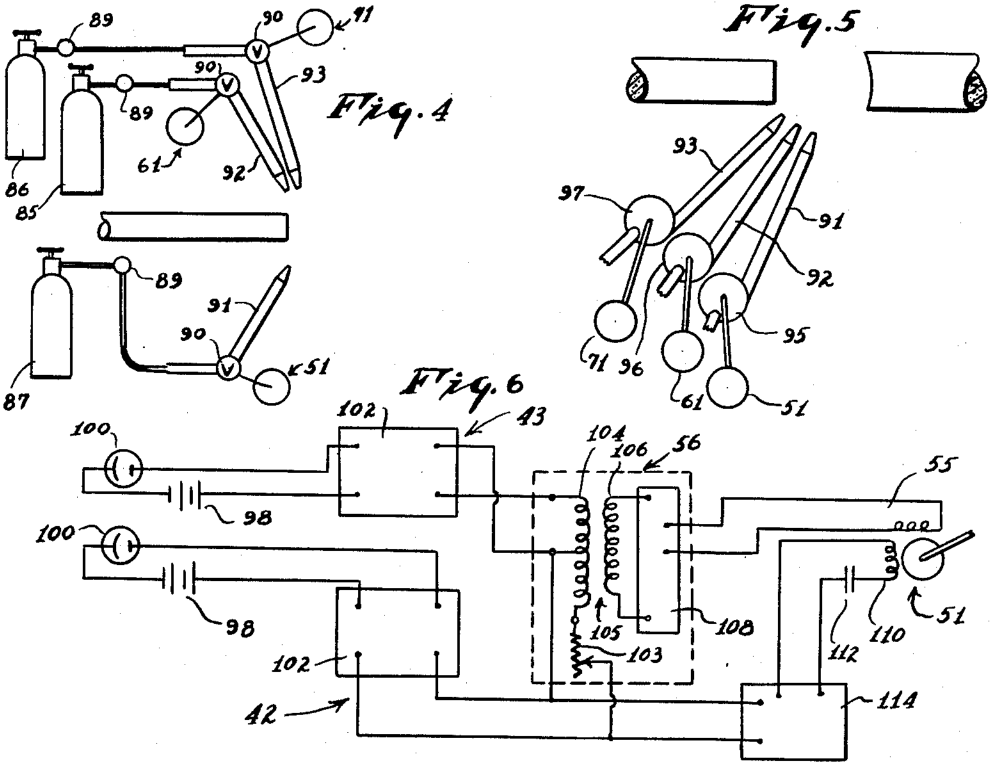
Figures 4 and 5 are diagrammatic views showing other modifications of the invention.
Figure 6 is a wiring diagram for one of the color control cells.

Figure 4 shows another modified form of the invention in which the color modifying materials are in the form of gases compressed in cylinders 85, 86 and 87. Each of these cylinders supplies gas through a pressure regulator 89 to a valve 90 which controls the flow of the gas through a discharge nozzle. The three different discharge nozzles for the three different color modifying materials are indicated by the reference characters 91, 92 and 93.

Each of the valves 90 is opened and closed by a different servomotor. The motors 51, 61 and 71, used to feed the color modifying strips in Figure 1, can be used to open and close the valves for the nozzles 91, 92 and 93, respectively, in Figure 4. In this modification of the invention it is desirable to have the motors 51, 61 and 71 reverse when the valves are to be closed. Adequate limit switches on the valve stop the motors 51, 61 and 71, when the valves reach their limits of movement, in accordance with conventional practice for electrically operated valves.

Figure 5 shows another modified form of the invention in which the color modifying material is in the form of a gas drawn from containers by blowers 95, 96 and 97 which supply gas to the nozzles 91, 92 and 93 respectively; and these blowers are driven by motors 51, 61 and 71, respectively. In both Figures 4 and 5, the nozzles 91, 92 and 93 supply streams or clouds of gas, depending upon the adjustment of the nozzles, to the region of the arc.

Different kinds of material are available for modifying the color of an arc light by adding different components of color to the light. Strip material for adding a red component can be made with lithium.

Figure 6 is a wiring diagram showing the preferred connections through which the monitoring cells control the operation of one of the servo motors. This illustration shows the monitoring cells of assemblies 42 and 43 connected with the controller 56 which supplies power to the control winding 55 of the servomotor 51.

Both of the monitoring cells in the assemblies 42 and 43 receive power from batteries 98 which are merely representative of a source of current, and preferably direct current.

Each of the cell assemblies 42 and 43 includes the battery 98; a photocell 100, which is merely representative of light-sensitive transducers; and an amplifier 102. The controller 56 includes a variable impedance 103 connected to a balanced primary 104 of a transformer 105 which has a secondary winding 106 connected to a servo amplifier 108. The output of the monitoring cell assembly 42 is connected, through the adjustable impedance 103, to one half of the balanced primary 104; and the output of the other monitoring cell assembly 43 is connected directly to the other half of the balanced primary 104.

The output of the controller 56 is connected to the phase sensitive control winding 55 of the motor 51. The servomotor also has a reference winding 110 which is supplied with power through the capacitor 112 from a motor supply amplifier 114. The input of the motor supply amplifier 114 is connected to the output of the monitor cell assembly 42 to provide a source of alternating current in synchronism with the operation of the projector shutter 32 (Figure 2).

In order to have the servomotor 51 operate in either a forward or reverse direction, in accordance with the intensity and phase of the current in the winding 55, the winding 110 has its alternating current properly phased by the use of the capacitor 112 in series with the output of the motor supply amplifier 114.

When the output from the monitoring cell assembly 43, supplied to one half of the primary 104, is equal to that portion of the output of the cell assembly 42 which is supplied through the adjustable impedance 103 to the other half of the primary 104, there will be no current induced into the secondary winding 106. The current which flows in either half of the primary 104 is in the form of pulses having the frequency of the shutter blades which send pulses of light to the monitoring cells 100. When the current pulses in each half of the primary 104 are unequal they produce, by the induction action of the transformer 105, alternating currents in the secondary winding 106.

The principle of operation of the controller 56 is illustrated in Figures 7–11. The portion of the signals supplied from the monitoring cell assembly 42 to one-half of the primary winding 104 are represented by the graph line 121 in Figure 7. This graph line has a lobe 122 corresponding to each passage of the shutter plate behind the gate of the projector. As long as the light reflected by the shutter plates remain constant, all of the lobes 122 will be of equal amplitude.

Figures 7, 8, 9, 10, 11:
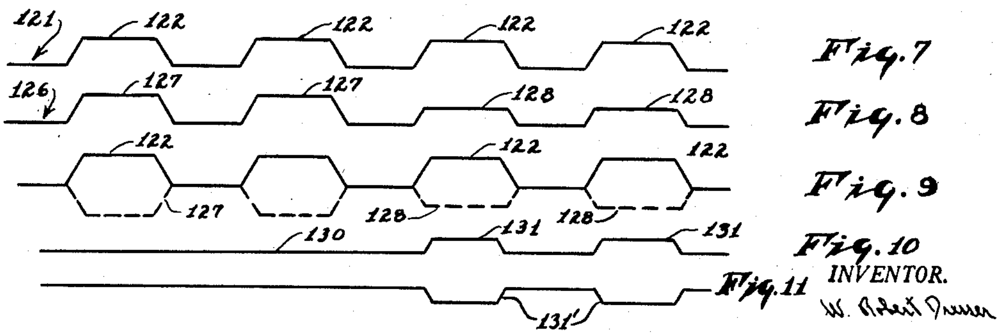
Figures 7–11 are diagrams showing the principle of operation of the invention in the control of the servomotors which regulate the supplying of color modifying material to the arc light.

The signals from the monitoring cell assembly 43, which are supplied to the other half of the transformer primary 104, are represented by the graph line 126 in Figure 8. There are lobes 127 and 128 at spaced regions along the graph line 126. The lobes 127 correspond to signals resulting from reflected light which has the normal blue component for which the photocell units 42 and 43 were initially balanced; whereas the lobes 128 correspond to reflected light which has less blue component than the normal light. Thus the lobes 128 have less amplitude than the lobes 127.

Figure 9 shows the effect of the opposing polarity of the current pulses flowing in the opposite halves of the transformer primary 104. From this graphic representation it will be apparent that when the lobes 122 are equal to the lobes 127, they balance one another to produce the graph shown in Figure 10 and the current induced into the secondary winding 106 is zero, as represented by the straight line 130.

Where the lobes 128, in Figure 9, are of less amplitude than lobes 122, then the lobes do not balance and there is a current induced by the secondary winding corresponding to the lobes 131 shown in Figure 10. It will be apparent that a reversal in the conditions, that is, an amplitude for the lobes 128 greater than that of the lobes 122 will result in lobes corresponding to the lobes 131, but having a phase reversal as indicated in Figure 11 and designated by the reference character 131'.

The preferred embodiments of this invention have been illustrated and described, but changes and modifications can be made and some features can be used in different combinations without departing from the invention as defined in the claims.

What is claimed is:

1. Apparatus for controlling the color of an arc light including electrodes between which an arc is discharged, at least one of the electrodes being a consumable electrode, automatic means for feeding the consumable electrode, color sensitive means for monitoring the light from the arc, means for feeding color modifying material into the arc, and automatic control apparatus for the material feeding means operated by the light sensitive means.

2. The combination with an arc light of apparatus for controlling the color of the arc, said apparatus including color sensitive devices for monitoring the light from the arc, apparatus for feeding color modifying material into the arc, and automatic control means for the feeding apparatus operated by the color sensitive devices.

3. The combination described in claim 2 characterized by a plurality of color sensitive devices which are sensitive to different color components, and a plurality of separate means for feeding the material to the arc, to effect different color modifications, the separate means for feeding the color modifying material being controlled by the color sensitive devices which are sensitive to the particular colors by which the respective feeding means modify the light of the arc.

4. The combination described in claim 2 characterized by a plurality of color sensitive devices with a different colored filter in front of each device to make it sensitive to a different component of color of the light from the arc, the apparatus for feeding color compensating material to the arc including a plurality of separate means for feeding material which will effect different changes in color, and control means from each of the color sensitive devices to the respective means for feeding material to add to the light of the arc the color component to which that device is sensitive.

5. The combination with a motion picture projector of an arc light having electrodes, means for feeding one of the electrodes with respect to the other, a plurality of color sensitive devices located in the light from the arc and each of which is sensitive to a different component of color, and color modifying means for the arc light including a plurality of separate means that feed material into the arc to modify the color of the arc light, each of the means for feeding different material being under the control of a different one of the light sensitive means.

6. The combination with a motion picture projector having an arc light, of apparatus for controlling the color of the light, comprising a plurality of different color sensitive devices located in the light from the arc and each sensitive to a different color component, apparatus for feeding a strip of material into the arc for modifying the color of the light by addition of a particular component of light, other apparatus for feeding a different kind of strip of material into the arc for modifying the light by adding a different component of color to the light, and control means connecting each apparatus with a different one of the color sensitive devices, each of the apparatus for feeding strip material into the arc being connected with the particular color sensitive device which is sensitive to the particular color component which that apparatus adds to the light from the arc.

7. The combination with a motion picture projector having an arc light, of apparatus for controlling the color of the light including a plurality of blowers, means for supplying a different color modifying material to each of the blowers, nozzles through which the respective blowers discharge clouds of the color modifying material into the arc, and control means for each of the blowers including a color sensitive device located in the light from the arc and sensitive to the color which is supplied to the arc by the blower which the light sensitive device controls.

8. The combination with a motion picture projector which has an arc light, of apparatus for controlling the color of the arc light, said apparatus including several different apparatus for feeding color modifying material into the arc, and means for selectively operating the different apparatus.

9. Apparatus for controlling the color of an arc light, including, in combination, a plurality of monitoring cells located in the path of light from the arc, each of the cells being sensitive to a different color component, a plurality of separate devices for feeding into the arc material which will modify the color of the arc, each of the devices having a supply of different color modifying material, mechanism for operating the feeding device for a particular color, control means for said mechanism connected with the monitoring cell which is responsive to that particular color, the control means including a switch for inaugurating operation of the mechanism when the monitoring cell does not receive the color to which it is sensitive, similar operating mechanism and control means for the other color modifying devices, and means for preventing operation of said mechanism when lack of color to the monitoring cells is the result of lack of light.

No references cited.